(12) United States Patent
Sofer et al.

(10) Patent No.: US 7,839,952 B2
(45) Date of Patent: Nov. 23, 2010

(54) DATA RATE COORDINATION IN PROTECTED VARIABLE-RATE LINKS

(75) Inventors: Ran Sofer, Tel Mond (IL); Jonathan Friedmann, Tel Aviv (IL)

(73) Assignee: Provigent Ltd, Herzliya (IL)

( * ) Notice: Subject to any disclaimer, the term of this patent is extended or adjusted under 35 U.S.C. 154(b) by 864 days.

(21) Appl. No.: 11/634,781

(22) Filed: Dec. 5, 2006

(65) Prior Publication Data

US 2008/0130726 A1    Jun. 5, 2008

(51) Int. Cl.
*H04L 27/00* (2006.01)

(52) U.S. Cl. .................. 375/299; 375/260; 375/316; 375/295; 375/267; 375/347; 375/349; 370/216; 370/217; 370/218; 370/221; 370/222; 370/223; 370/225; 370/226; 370/227; 370/228

(58) Field of Classification Search .............. 375/260, 375/316, 295, 267, 299, 349, 347; 455/101; 714/755; 370/329, 465, 464, 466
See application file for complete search history.

(56) References Cited

U.S. PATENT DOCUMENTS

| | | | |
|---|---|---|---|
| 4,310,813 A | 1/1982 | Yuuki et al. |
| 4,321,705 A | 3/1982 | Namiki |
| 4,367,555 A | 1/1983 | Namiki et al. |
| 4,438,530 A | 3/1984 | Steinberger |
| 4,479,258 A | 10/1984 | Namiki |
| 4,557,330 A | 12/1985 | Russell et al. |
| 4,575,862 A | 3/1986 | Tahara et al. |
| 4,606,054 A | 8/1986 | Amitay et al. |
| 4,631,734 A | 12/1986 | Foschini |
| 4,644,562 A | 2/1987 | Kavehrad et al. |
| 4,688,235 A | 8/1987 | Tahara et al. |

(Continued)

FOREIGN PATENT DOCUMENTS

EP    0454249 A1    10/1991

(Continued)

OTHER PUBLICATIONS

American National Standard T1.105-2001, "Synchronous optical network (SONET)—basic description including multiplex structure, rates and format", Alliance for Telecommunications Industry Solutions, 2001.

(Continued)

*Primary Examiner*—Chieh M Fan
*Assistant Examiner*—Siu M Lee
(74) *Attorney, Agent, or Firm*—D. Kligler I.P. Services Ltd

(57) ABSTRACT

A method for communication includes sending first data over a first communication link to a destination communication system at a first data rate, which can be varied. Second data, including at least a portion of the first data, is sent over a second communication link from the source communication system to the destination communication system at a second data rate, which can be varied. First and second data rates of the respective first and second communication links are dynamically set. At least the portion of the first data is selectively extracted from one of the first and second data at the destination communication system. In some embodiments, the first data equals the second data, and the data is extracted without data loss.

50 Claims, 2 Drawing Sheets

U.S. PATENT DOCUMENTS

| | | | |
|---|---|---|---|
| 4,761,784 A | 8/1988 | Srinivasagopalan et al. | |
| 4,857,858 A | 8/1989 | Tahara | |
| 4,910,468 A | 3/1990 | Ohtsuka et al. | |
| 4,914,676 A | 4/1990 | Iwamatsu et al. | |
| 4,992,798 A | 2/1991 | Nozue et al. | |
| 5,023,620 A | 6/1991 | Matsuura | |
| 5,068,667 A | 11/1991 | Mizoguchi | |
| 5,075,697 A | 12/1991 | Koizumi et al. | |
| 5,237,318 A | 8/1993 | Auclair et al. | |
| 5,241,320 A | 8/1993 | Mizoguchi | |
| 5,247,541 A | 9/1993 | Nakai | |
| 5,268,685 A | 12/1993 | Fujiwara | |
| 5,311,545 A | 5/1994 | Critchlow | |
| 5,311,546 A | 5/1994 | Paik et al. | |
| 5,313,467 A | 5/1994 | Varghese et al. | |
| 5,383,224 A | 1/1995 | Mizoguchi | |
| 5,406,589 A | 4/1995 | Iwamatsu et al. | |
| 5,432,522 A | 7/1995 | Kurokami | |
| 5,471,508 A | 11/1995 | Koslov | |
| 5,495,502 A | 2/1996 | Andersen | |
| 5,524,027 A | 6/1996 | Huisken | |
| 5,541,951 A | 7/1996 | Juhasz et al. | |
| 5,541,955 A | 7/1996 | Jacobsmeyer | |
| 5,631,896 A * | 5/1997 | Kawase et al. | 370/228 |
| 5,710,799 A | 1/1998 | Kobayashi | |
| 5,727,032 A | 3/1998 | Jamal et al. | |
| 5,742,646 A | 4/1998 | Woolley et al. | |
| 5,809,070 A | 9/1998 | Krishnan et al. | |
| 5,838,224 A | 11/1998 | Andrews | |
| 5,838,740 A | 11/1998 | Kallman et al. | |
| 5,844,950 A | 12/1998 | Aono et al. | |
| 5,901,343 A | 5/1999 | Lange | |
| 5,905,574 A | 5/1999 | Vollbrecht et al. | |
| 5,920,595 A | 7/1999 | Iwamatsu | |
| 5,940,453 A | 8/1999 | Golden | |
| 5,987,060 A | 11/1999 | Grenon et al. | |
| 6,215,827 B1 | 4/2001 | Balachandran et al. | |
| 6,236,263 B1 | 5/2001 | Iwamatsu | |
| 6,252,912 B1 | 6/2001 | Salinger | |
| 6,262,994 B1 | 7/2001 | Dirschedl et al. | |
| 6,418,164 B1 | 7/2002 | Endres et al. | |
| 6,452,964 B1 | 9/2002 | Yoshida | |
| 6,466,562 B1 | 10/2002 | Yoshida et al. | |
| 6,501,953 B1 | 12/2002 | Braun et al. | |
| 6,611,942 B1 * | 8/2003 | Battistello et al. | 714/821 |
| 6,628,707 B2 | 9/2003 | Ratie et al. | |
| 6,647,059 B1 | 11/2003 | Faruque | |
| 6,665,810 B1 | 12/2003 | Sakai | |
| 6,678,259 B1 * | 1/2004 | Schwengler | 370/329 |
| 6,826,238 B2 | 11/2004 | Ahn | |
| 6,829,298 B1 | 12/2004 | Abe et al. | |
| 6,836,515 B1 | 12/2004 | Kay et al. | |
| 6,888,794 B1 | 5/2005 | Jovanovic et al. | |
| 6,915,463 B2 * | 7/2005 | Vieregge et al. | 714/704 |
| 6,920,189 B1 | 7/2005 | Spalink | |
| 6,954,504 B2 * | 10/2005 | Tiedemann et al. | 375/259 |
| 7,003,042 B2 | 2/2006 | Morelos-Zaragoza et al. | |
| 7,016,296 B2 | 3/2006 | Hartman | |
| 7,046,753 B2 | 5/2006 | Resheff et al. | |
| 7,047,029 B1 | 5/2006 | Godwin et al. | |
| 7,133,425 B2 | 11/2006 | McClellan | |
| 7,133,441 B1 | 11/2006 | Barlev et al. | |
| 7,187,719 B2 | 3/2007 | Zhang | |
| 7,200,188 B2 | 4/2007 | Fague et al. | |
| 7,254,190 B2 | 8/2007 | Kwentus et al. | |
| 7,333,556 B2 | 2/2008 | Maltsev et al. | |
| 7,366,091 B1 * | 4/2008 | Lahti et al. | 370/218 |
| 7,418,240 B2 | 8/2008 | Hsu et al. | |
| 7,463,867 B2 * | 12/2008 | Luo et al. | 455/101 |
| 7,492,701 B2 | 2/2009 | Song et al. | |
| 2001/0017897 A1 | 8/2001 | Ahn | |
| 2002/0016933 A1 | 2/2002 | Smith et al. | |
| 2002/0051498 A1 | 5/2002 | Thomas et al. | |
| 2002/0061752 A1 | 5/2002 | Kurokami | |
| 2002/0161851 A1 | 10/2002 | Chang | |
| 2002/0181490 A1 | 12/2002 | Frannhagen et al. | |
| 2003/0021370 A1 | 1/2003 | Menkhoff | |
| 2003/0043778 A1 | 3/2003 | Luschi et al. | |
| 2003/0056158 A1 | 3/2003 | Yue | |
| 2003/0066082 A1 | 4/2003 | Kliger et al. | |
| 2003/0135532 A1 | 7/2003 | Peting | |
| 2003/0203721 A1 | 10/2003 | Berezdivin et al. | |
| 2004/0017860 A1 | 1/2004 | Liu | |
| 2004/0063416 A1 | 4/2004 | Kuenen et al. | |
| 2004/0081081 A1 * | 4/2004 | Colombo | 370/216 |
| 2004/0086668 A1 | 5/2004 | Dronzek et al. | |
| 2004/0151108 A1 | 8/2004 | Blascoet et al. | |
| 2004/0217179 A1 | 11/2004 | Garner | |
| 2005/0002474 A1 | 1/2005 | Limberg | |
| 2005/0010853 A1 | 1/2005 | Duvant et al. | |
| 2005/0063496 A1 | 3/2005 | Guillouard et al. | |
| 2005/0075078 A1 * | 4/2005 | Makinen et al. | 455/67.15 |
| 2005/0130616 A1 * | 6/2005 | Khayrallah et al. | 455/242.2 |
| 2005/0169401 A1 | 8/2005 | Abraham et al. | |
| 2005/0190868 A1 | 9/2005 | Khandekar et al. | |
| 2005/0239398 A1 | 10/2005 | Lai | |
| 2005/0265436 A1 | 12/2005 | Suh et al. | |
| 2005/0286618 A1 * | 12/2005 | Abe | 375/219 |
| 2006/0008018 A1 | 1/2006 | Kolze | |
| 2006/0013181 A1 | 1/2006 | Stoplman et al. | |
| 2006/0056554 A1 | 3/2006 | Lin et al. | |
| 2006/0093058 A1 | 5/2006 | Skraparlis | |
| 2006/0107179 A1 | 5/2006 | Shen et al. | |
| 2006/0203943 A1 | 9/2006 | Scheim et al. | |
| 2006/0209939 A1 | 9/2006 | Mantha | |
| 2007/0076719 A1 * | 4/2007 | Allan et al. | 370/392 |
| 2007/0116143 A1 | 5/2007 | Bjerke et al. | |
| 2007/0116162 A1 | 5/2007 | Eliaz et al. | |
| 2007/0133397 A1 * | 6/2007 | Bianchi et al. | 370/225 |
| 2007/0153726 A1 * | 7/2007 | Bar-Sade et al. | 370/329 |
| 2007/0230641 A1 | 10/2007 | Yehudai | |
| 2008/0002581 A1 | 1/2008 | Gorsetman et al. | |
| 2008/0008257 A1 | 1/2008 | Yonesi et al. | |
| 2008/0043829 A1 | 2/2008 | Shiue et al. | |
| 2008/0080634 A1 | 4/2008 | Kotecha et al. | |
| 2008/0130616 A1 * | 6/2008 | Wengerter et al. | 370/345 |
| 2008/0155373 A1 | 6/2008 | Friedman et al. | |
| 2008/0254749 A1 | 10/2008 | Ashkenazi et al. | |
| 2008/0259901 A1 | 10/2008 | Friedman et al. | |
| 2009/0022239 A1 * | 1/2009 | Kimura et al. | 375/267 |
| 2009/0049361 A1 | 2/2009 | Koren et al. | |
| 2009/0092208 A1 | 4/2009 | Montekyo et al. | |

FOREIGN PATENT DOCUMENTS

| | | |
|---|---|---|
| EP | 1365519 A1 | 11/2003 |
| JP | 6021762 A | 1/1994 |
| JP | 9064791 A | 3/1997 |
| JP | 200161187 A | 3/2001 |
| JP | 2002345023 A | 11/2002 |
| JP | 2004179893 A | 6/2004 |
| WO | 0060802 A1 | 10/2000 |
| WO | 0076114 A1 | 12/2000 |
| WO | 0077952 A1 | 12/2000 |
| WO | 2004086668 A1 | 10/2004 |
| WO | 2006097735 A2 | 9/2006 |
| WO | 2006118892 A1 | 11/2006 |
| WO | 2007040906 A2 | 4/2007 |

OTHER PUBLICATIONS

Benani et al., "Comparison of Carrier Recovery Techniques in M-QAM Digital Communications Systems", Proceedings of 13th Annual Canadian Conference on Electrical and Computer Engineering, pp. 73-77, Halifax, Canada, Mar. 7-10, 2000.

Best R., "Phase Locked Loops: Design, Simulation, and Applications", McGraw Hill Professional, 5th Edition, pp. 81-92, Jun. 20, 2003.

Calderbank A., "Multilevel Codes and Multistage Decoding", IEEE Transactions on Communications, vol. 37, No. 3 Mar. 1989.

Colavolpe et al., "Algorithms for iterative decoding in the presence of strong phase noise", IEEE Journal on Selected Areas in Communications, vol. 23, No. 9, pp. 1748-1757, Sep. 2005.

Goeckel D., "Adaptive Coding for Time-Varying Channels Using Outdated Fading Estimates", IEEE Transactions on Communications, vol. 47, No. 6, Jun. 1999.

Dr. Lin-Nan Lee, "LDPC Codes, Application to Next Generation Communication Systems", Hughes Network System Oct. 8, 2003.

Duel-Hallen et al., "Long Range Prediction of Fading Signals: Enabling Adaptive Transmission for Mobile Radio Channels" IEEE Signal Processing Magazine, vol. 17, No. 3, pp. 62-75, May 2000.

ITU Recommendation G.703 , "General Aspects of Digital Transmission Systems-Terminal Equipments-Physical/Electrical Characteristics of Hierarchical Digital Interfaces", Geneva, Switzerland 1991.

ITU Recommendation G.704, "Series G: Transmission Systems and Media, Digital Systems and Networks, Digital Transmission Systems-Terminal Equipments-General, Synchronous Frame Structures used at 1544, 6312, 2048, 8448 and 44736 kbit/s hierarchical levels", Oct. 1998.

Gagnon et al., "A Simple and Fast Carrier Recovery Algorithm for High-Order QAM", IEEE Communications Letters, vol. 9, No. 10, pp. 918-920, Oct. 2005.

Gallager R., "Low-Density Parity—Check Codes", IRE Transactions on Information Theory, vol. 7, pp. 21-28, Jan. 1962.

GR-253-CORE by Telcordia Technologies, "Synchronous optical network (SONET) transport systems: common criteria" Issue 3, Sep. 2000.

Hassan K., "LPDC encoded pilots for iterative receiver improvement", Thesis submiteed to the College Engineering of Wichita State University, Dec. 2005.

Ericsson AB, "Capacity without ties; Mini-Link microwave transmission solution", EN/LZT 712 0117 R2, Molndal, Sweden, 2005.

Hu et al., "Adaptive Modulation Using Long Range Prediction for Flat Rayleigh Fading Channels", Proceedings of the IEEE International Symposium on Information Theory, Sorrento, Italy, Jun. 25-30, 2000.

Niu et al., "Iterative Channel Estimation and LDPC Decoding over Flat Fading Channels: A Factor Graph Approach" 2003 Conference on Information Sciences and Systems, the Johns Hopkins University, Mar. 12-14, 2003.

Imai et al., "A New Multilevel Coding Method Using Error-Correcting Codes", IEEE Transactions on Information Theory, vol. IT-23, No. 3, 1977.

ITU Recommendation G.707/Y.1322, "Series G: Transmission systems and media, digital systems and networks, digital terminal equipments-general: Series Y: global information infrastructure and internet protocol aspects—transport; Network node interface for the syncronours digital hierarchy (SDH)", Oct. 2000.

ITU Recommendation G.783, "General Aspects of Digital Transmission Systems: Terminal Equipments—Characteristics of Syncronous Digital Hierarchy (SDH) Equipment Functional Blocks", Jan. 1994.

Sun J., "An Introduction to low Density Parity Check (LDPC) Codes", West Virginia University, Jun. 3, 2003.

Johnson et al., "Blind Equalization Using the Constant Modulus Criterion: A Review", Proceedings of the IEEE, vol. 86, No. 10, Oct. 1998.

Kim et al., "Design of Carrier Recovery Algorithm for High-Order QAM with Large Frequency Acquisition Range", IEEE Internatinal Conference on Communications (ICC), pp. 1016-1020, vol. 4, Helsinki, Finland, Jun. 11-14, 2001.

Kschischang F., "Capacity Approching Codes, Iterative Decoding Algorithms and Their Application: Codes defined on Graphs", IEEE Communications Magazine, pp. 118-125, Aug. 2003.

Mielczarek et al., "Improving phase estimation with enhanced turbo decoders", Nordic Radio Symposium 2001 (NRS01), Nynashamn, Sweden, Apr. 3-5, 2001.

Mielczarek et al., "Phase offset estimation using enhanced turbo decoders", Proceedings of the IEEE International Conference on Communications (ICC2002), vol. 3, pp. 1536-16460, New York, USA, Apr. 28-May 2, 2002.

Pottie et al., "Multilevel Codes based on Partitioning", IEEE Transactions on Information Theory, vol. 35, No. 1, pp. 87-98, Jan. 1989.

Richardson et al. , "An Introduction to the Analysis of Iterative Coding Systems", Proceedings of the 1999 Institute for Mathematics and its Applications (IMA) Summer Program: codes, systems and graphical models, Minneapolis, USA Aug. 2-6, 1999.

Richardson etr al., "Capacity Approaching codes; Iterative Decoding Algorithms and Their Application: The Renaissance of Gallager's Low-Densityy parity Check Codes", IEEE Communications Magazine, pp. 126-131, Aug. 2003.

Riegel M., "Requirements for edge-to edge estimation of time deivision multiplexed (TDM) circuits over packet switching networks", IETF Network Working Group, RFC 4197, Oct. 2005.

Ryan et al., "An introduction to LDPC Codes", GlobeCom 2003, San Francisco, USA, Dec. 5, 2003.

Saroka et al., "Joint Carrier Phase Estimation and Turbo Decoding Using Bit-Carrier-Phase APP Decoder", IEEE Transactions on Communications, 2004.

Satorius et al., "Adaptive modulation and coding techniques in MUOS fading/scintillation environments", Proceedings of the IEEE Military Communications Conference, Anaheim, USA, vol. 1, pp. 321-327, Oct. 7-10, 2002.

Standard T1.102-1993 of the ANSI, "American National Standard for Telecommunications-Digital Hierarchy-Electrical Interfaces", Dec. 1993.

Worthen et al., "Unified Design of Iterative Receivers Using Factor Graphs", IEEE Transactions on Information Theory, vol. 47, No. 2, pp. 843-849, Feb. 2001.

Jin et al., "Analysis of Joint Channel Estimation and LDPC Decoding on Block Fading Channels", International Symposium on Information Theory and its Applications, ISITA2004, Parma, Italy, Oct. 10-13, 2004.

U.S. Appl. No. 11/285,414 Official Acrtion dated Mar. 6, 2009.
U.S. Appl. No. 11/285,414 Official Action dated May 23, 2008.
U.S. Appl. No. 11/285,414 Official Action dated Nov. 12, 2008.
U.S. Appl. No. 11/394,172 Official Action dated Jan. 21, 2009.
U.S. Appl. No. 11/394,172 Official Action dated Jun. 16, 2008.
U.S. Appl. No. 11/394,172 Official Action dated Jun. 26, 2009.
U.S. Appl. No. 11/479,050 Official Action dated Jul. 24, 2009.
U.S. Appl. No. 11/479,050 Official Action dated Mar. 4, 2009.
U.S. Appl. No. 11/483,078 Official Action dated Mar. 27, 2009.
U.S. Appl. No. 11/483,078 Official Action dated Jun. 2, 2008.
U.S. Appl. No. 11/483,078 Official Action dated Nov. 12, 2008.
International Application PCT/IL2006/001344 Search Report dated Mar. 13, 2008.
International Application PCT/IL2007/000326 Search Report dated Aug. 1, 2008.
International Application PCT/IL2007/000812 Search Report dated Jun. 4, 2008.
International Application PCT/IL2007/001410 Search Report dated Jan. 26, 2009.
International Application PCT/IL2008/001321 Search Report dated Feb. 19, 2009.
International Application PCT/IL2008/000453 Search Report dated Jun. 17, 2009.
Chinese Application No. 200580028811.1 Official Action dated Dec. 5, 2008.
European Application No. 08290290.9 Official Action dated Jun. 18, 2009.
European Application No. 08290290.9 Search Report dated Oct. 15, 2008.
Japanese Application No. 2007518808 Official Action dated Jan. 29, 2009.
Japanese Application No. 2007518808 Official Action dated Jun. 4, 2008.
U.S. Appl. No. 11/645,828 Official Action dated Sep. 15, 2009.
U.S. Appl. No. 11/394,172 Official Action dated Mar. 2, 2010.

U.S. Appl. No. 11/787,059 Official Action dated Mar. 3, 2010.

U.S. Appl. No. 11/787,059 Official Action dated July 9, 2010.

Japanese Patent Application # 2007-172513 Official Action dated Jul. 5, 2010 (with translation).

European Patent Application # 08738160.4 Search Report dated Aug. 26, 2010.

Diaz et al., "The Use of Coding and Diversity Combining for Mitigating Fading Effects in a DS/CDMA System", IEEE Transactions on Vehicular Technology, vol. 47, No. 1, pp. 95-102, Feb. 1, 1998.

Lampe et al., "Misunderstandings about Link Adaptation for Frequency Selective Fading Channels", 13th IEEE International Symposium on Personal, Indoor and Mobile Radio Communications, vol. 2, pp. 710-714, Sep. 15-18, 2002.

Nishimura et al., "Dynamic Rate Control for Mobile Multimedia Communication", Proceedings of the 1998 Communications Society Conference of IEICE, Sep. 29-Oct. 2, 1998 (abstract).

\* cited by examiner

DATA RATE COORDINATION IN PROTECTED VARIABLE-RATE LINKS

FIELD OF THE INVENTION

The present invention relates generally to communication systems, and particularly to methods and systems for data rate coordination in wireless links.

BACKGROUND OF THE INVENTION

Various communication systems, such as microwave links, transfer data at variable data rates. For example, U.S. Patent Application Publication 2005/0075078, whose disclosure is incorporated herein by reference, describes a method for transmitting signals via a point-to-point microwave radio link. In order to improve the efficiency on the radio link, transmitted packets are classified before transmission based on quality of service parameters assigned to each packet. The signals are modulated for transmission using a real-time adaptive modulation. The modulation is adapted based on the current traffic amount, signal quality measurements indicative of the propagation conditions on the radio link, and the classification of packets comprised in the signals.

Some communication systems increase the transmission reliability by using protected configurations of two or more communication links in parallel. For example, Ericsson LM (Kista, Sweden) offers a microwave link product line called MINI-LINK, which supports such protected configurations. Further details regarding this product are available in www.ericsson.com/products/hp/MINI_LINK_pa.shtml.

SUMMARY OF THE INVENTION

There is therefore provided, in accordance with an embodiment of the present invention, a method for communication, including:

sending first data over a first communication link to a destination communication system at a first data rate, which can be varied;

sending second data, including at least a portion of the first data, over a second communication link, from the source communication system to the destination communication system at a second data rate, which can be varied;

dynamically setting respective first and second data rates of the first and second communication links; and at the destination communication system, selectively extracting at least the portion of the first data from one of the first and second data.

In some embodiments, dynamically setting the first and second data rates includes setting the data rates responsively to at least one parameter selected from a group of parameters consisting of a characteristic of the first communication link, a metric derived from the first communication link, an operating condition of the first communication link, a characteristic of the second communication link, a metric derived from the second communication link and an operating condition of the second communication link.

In another embodiment, the first data equals the second data, and selectively extracting at least the portion of the first data includes dynamically switching between the first and second communication links. Dynamically switching between the first and second communication links sometimes includes alternating between the first and second data without data loss.

In an embodiment, sending the first and second data includes framing the first data in data frames and sending first and second replicas of the data frames respectively over the first and second communication links, and dynamically switching between the first and second communication links includes extracting each of the data frames from one of the first and second replicas. Framing the first data in the data frames may include encoding the first data using a forward error correction (FEC) code to produce FEC blocks, and framing each of the FEC blocks in one of the respective data frames.

In yet another embodiment, the first and second communication links include point-to-point links operating in one of a microwave and a millimeter wave frequency band.

In still another embodiment, selectively extracting at least the portion of the first data includes calculating reception quality metrics of the first and second communication links and extracting at least the portion of the first data from one of the first and second data responsively to the reception quality metrics. Selectively extracting at least the portion of the first data may include extracting at least the portion of the first data from the first data as long as the reception quality metric of the first communication link does not exceed a predetermined threshold.

In some embodiments, the reception quality metrics include at least one metric selected from a group of metrics consisting of bit error rates (BER), frame error rates (FER), signal to noise ratios (SNR), mean square errors (MSE), forward error correction (FEC) code indications and metrics derived from equalizer coefficients.

In another embodiment, sending the first and second data includes encoding the first and second data using respective first and second forward error correction (FEC) codes and modulating the encoded first and second data using respective first and second signal constellations, and dynamically setting the first and second data rates includes jointly selecting the first and second FEC codes and the first and second signal constellations.

Dynamically setting the first and second data rates sometimes includes calculating a first data rate value for the first communication link irrespective of the second communication link, calculating a second data rate value for the second communication link irrespective of the first communication link, and setting the first and second data rates responsively to the first and second values.

In some embodiments, calculating the first and second data rate values includes determining the data rate values responsively to respective first and second reception quality metrics of the first and second communication links and to a target quality of service defined for the first and second communication links. Additionally or alternatively, calculating the first and second data rate values may include determining the data rate values responsively to a service type carried by the first and second data.

In an embodiment, dynamically setting the first and second data rates includes setting the first and second data rates to a minimum of the first and second data rate values. In an alternative embodiment, dynamically setting the first and second data rates includes setting the first and second data rates to a maximum of the first and second data rate values. Further alternatively, dynamically setting the first and second data rates includes setting the first and second data rates to an intermediate data rate between the first and second data rate values.

In another embodiment, the first data rate is higher than the second data rate, and sending the first and second data includes sending only the portion of the first data over the second communication link in order to protect the portion of the first data.

In yet another embodiment, when channel conditions of the first communication link deteriorate, dynamically setting the first and second data rates includes:

reducing the first data rate while extracting at least the portion of the first data from the first data;

when the first data rate reaches the second data rate, synchronizing the first and second data; and when the channel conditions of the first communication link further deteriorate, beginning to extract at least the portion of the first data from the second data without data loss.

In still another embodiment, dynamically setting the first and second data rates includes synchronizing modifications of the first and second data rates between the first and second communication links and between the source and destination communication systems.

In some embodiments, the first communication link is part of a plurality of communication links connecting the source and destination communication systems, the second communication link includes a backup link for protecting one of the plurality of the communication links, and the method includes assigning the second communication link to protect the first communication link.

In another embodiment, the method includes monitoring respective channel conditions of the plurality of the communication links, and selecting a link having worst channel conditions among the plurality to serve as the first communication link and to be protected by the second communication link. In yet another embodiment, the backup link is part of two or more backup links for protecting respective two or more of the plurality of the communication links.

In some embodiments, dynamically setting the first and second data rates includes modifying the first and second data rates in coordination.

There is additionally provided, in accordance with an embodiment of the present invention, a communication apparatus, including:

a source communication system, which is arranged to transmit first data over a first communication link at a first data rate, which can be varied, and to transmit second data, including at least a portion of the first data, over a second communication link at a second data rate, which can be varied; and a destination communication system, which is arranged to receive the first and second data and to selectively extract at least the portion of the first data from one of the first and second data, wherein one of the source and destination communication systems includes a controller, which is arranged to dynamically set the first and second data rates in the first and second communication links.

The present invention will be more fully understood from the following detailed description of the embodiments thereof, taken together with the drawings in which:

DETAILED DESCRIPTION OF EMBODIMENTS

Overview

Communication links, such as point-to-point microwave links, are sometimes deployed in protected configurations in which data is transmitted in parallel over a primary link and a secondary link. The receiving side selects the data of one of the links, typically based on reception quality metrics provided by the links.

When the primary and secondary links use variable data rates, such as when the two links use adaptive coding and modulation (ACM), the data rates of the links should be coordinated. Additionally, data rate variations should be synchronized among the different elements of the protected link.

Embodiments of the present invention provide methods and systems for coordinating and synchronizing the data rates in protected communication links. The methods described herein can be used in dual-link configurations, as well as in configurations comprising a higher number of links.

The methods and systems described herein enable protected links to optimize their data throughput under varying channel conditions. Additionally, embodiments of the present invention provide different trade-offs between the level of protection and the achievable data throughput.

System Description

Figure 1:
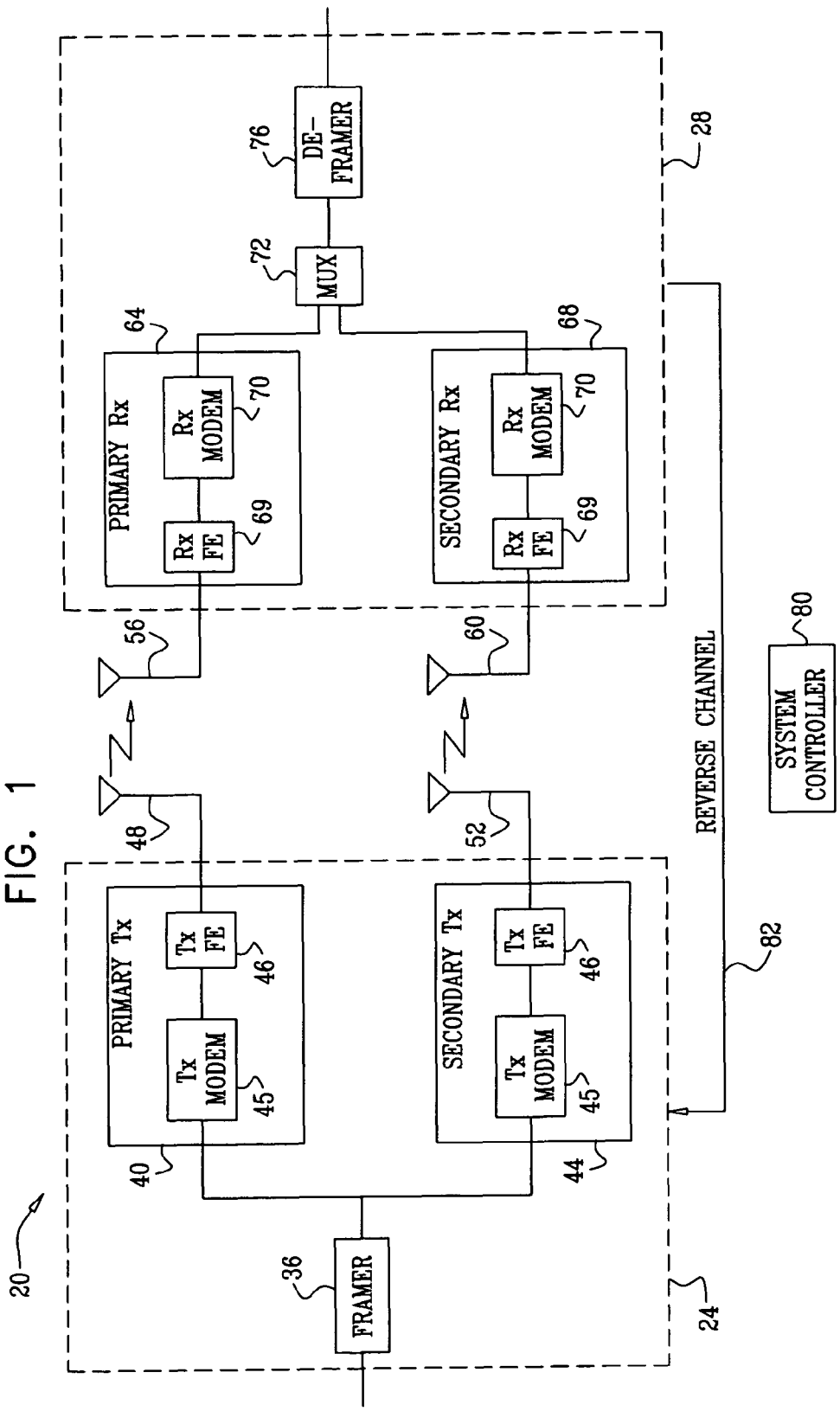
FIG. 1 is a block diagram that schematically illustrates a protected communication link, in accordance with an embodiment of the present invention.

FIG. 1 is a block diagram that schematically illustrates a protected communication link 20, in accordance with an embodiment of the present invention. In the present example, link 20 comprises a point-to-point microwave link. In order to protect the data transmitted over the link, link 20 transfers the data in parallel over two communication links, referred to as a primary link and a secondary link.

Link 20 comprises a dual transmitter 24, which transmits the data to a dual receiver 28. Data entering the dual transmitter is formatted and encapsulated by a framer 36. The formatted data is provided in parallel to a primary transmitter 40 and a secondary transmitter 44. Each transmitter comprises a variable-rate transmit modem 45, which modulates the data and applies forward error correction (FEC). The modulated signal is filtered, up-converted to a suitable radio frequency (RF) frequency and amplified by a transmitter front end (TX FE) 46. The primary and secondary transmitters transmit the RF signals via transmit antennas 48 and 52, respectively.

The signals transmitted by the primary and secondary transmitters respectively traverse primary and secondary wireless communication channels. The two channels differ from one another in frequency, polarization and/or antenna position. Since the two channels typically have different characteristics and conditions, poor channel conditions that may cause transmission errors are unlikely to be correlated between the channels. Thus, the two channels provide a certain amount of communication diversity and protection.

The signals transmitted over the primary and secondary channels are respectively received by receive antennas 56 and 60 and provided to a primary receiver 64 and a secondary receiver 68 in dual receiver 28. Receivers 64 and 68 process the received signals to extract the data.

Each receiver comprises a receiver front end (RX FE) 69, which down-converts and digitizes the received RF signal. The RX FE may also perform functions such as filtering, equalization, gain control and/or carrier recovery. The digital signal produced by the RX FE is provided to a variable-rate receive modem 70, which demodulates the signal and decodes the FEC code. Each of receivers 64 and 68 provides the extracted data to a multiplexer (MUX) 72, typically comprising a switch matrix.

MUX 72 selects whether to use the data provided by the primary or the secondary receiver, typically based on the reception quality measured by each receive modem 70. The data is then de-formatted or de-capsulated by a de-framer 76 and provided as output.

MUX 72 can apply different policies and criteria in choosing between the primary and secondary receivers. In some embodiments, the data transmitted over the primary and secondary links is partitioned by framer 36 into frames, and the receiver of each link calculates a reception quality metric for each received frame.

For example, the data in each frame may be encoded with a block FEC code, such as a low-density parity check (LDPC) code. The FEC decoder in the receive modem of each link produces a metric indicating whether the frame was decoded correctly, or whether the decoded frame has remaining uncorrected bit errors. Alternatively, the reception quality metric may comprise any other suitable metric, such as bit error rate (BER), frame error rate (FER), signal to noise ratio (SNR) and/or mean square error (MSE) estimates of the received frame.

Further alternatively, in some embodiments, each of the primary and secondary receivers comprises an adaptive equalizer, which compensates for the channel response of the respective communication link. Each equalizer comprises a digital filter, whose coefficient values can be adapted. In these embodiments, one or more of the equalizer coefficient values in each of the two receivers can also be used as reception quality metrics.

MUX 72 examines the two reception quality metrics produced by the primary and secondary receivers for a particular frame, and determines which of the two decoded frame to forward to de-framer 76. MUX 72 may choose between the primary and secondary links on a frame-by-frame basis, selecting the frame having the highest reception quality. In an alternative embodiment, a minimum threshold is defined for the metric. The MUX selects the frames of the primary link, as long as their metric values are higher than the threshold. When the metric values of the frames of the primary link drop below the threshold, the MUX selects the frames of the secondary link, provided their metrics have higher values.

Note that the definition of the two links as primary and secondary may be arbitrary and may change with time. For example, at any given time, the link whose frames are currently selected by MUX 72 can be defined as being the primary link, and the other link defined as the secondary link. When MUX 72 begins to select the frames of the other link, the link roles may be reversed.

Both the primary and secondary links transfer data at a variable data rate. Varying the data rate of a particular link enables the link to adapt to changing channel conditions and other operating conditions, such as weather-related changes in the channel attenuation, fading and interference. When channel conditions are good, the data rate can be increased, thus increasing the link throughput without compromising quality. When channel conditions deteriorate, the service quality can be maintained by reducing the data rate.

As noted above, the transmit and receive modems in both the primary and the secondary links comprise variable-rate modems. In some embodiments, the links vary their data rates using adaptive coding and modulation (ACM). In ACM, the code rate of the FEC code and the signal constellation used by the modem are jointly selected to provide the desired data rate and/or quality of service. Typically, multiple combinations of code rate and signal constellation are predefined. Each combination of code rate and signal constellation is referred to as an ACM setting. A suitable ACM setting is selected and used at any given time, often based on reception quality measurements performed by the receiver.

In some embodiments, the signal constellations of different ACM settings have different numbers of symbols, i.e., a different number of bits per symbol. For example, a set of four ACM settings may use four-symbol quaternary phase shift keying (QPSK), sixteen-symbol quadrature-amplitude modulation (16-QAM), 64-QAM and 256-QAM constellations. These four constellations modulate two, four, six and eight bits per symbol, respectively. The baud rate (and hence the RF bandwidth) of the transmitted signal is usually the same for all ACM settings, so as to fully utilize the bandwidth allocated to the link. Each ACM setting uses a particular FEC code. The code rates used in the different ACM settings are typically in the range of 0.5-1, although lower code rates can also be used.

Data Rate Coordination

As noted above, embodiments of the present invention are mainly concerned with coordinating the data rates of the primary and secondary links. When the two links transmit the same data, their data rates should be coordinated, even though their channel conditions may differ. Link 20 comprises a system controller 80, which examines the reception quality in the primary and secondary links and jointly determines the ACM settings to be used by the links.

Controller 80 may determine the ACM settings of the two links based on the estimated channel conditions measured by the primary and secondary receivers. The receivers can use any suitable method or metric for estimating the channel conditions. For example, U.S. Patent Application Publication 2005/0075078, cited above, describes signal quality measurements that can be used for this purpose. Additionally or alternatively, controller 80 may determine the ACM setting using any other suitable policy or criterion and based on any suitable operating conditions of the primary and secondary links, such as based on the service type (e.g., voice, video) carried by the data and/or the desired quality of service.

In some embodiments, controller 80 enforces a single ACM setting in both the primary and the secondary links. As a result, MUX 72 accepts two parallel streams of frames from the two links, and may select the appropriate frames, as described above. The protection provided in these embodiments is hitless, since no bits are lost when switching between the primary and the secondary links.

On the other hand, since both links are constrained to have the same ACM setting, in some cases one of the links may operate sub-optimally. For example, under a certain policy, the system controller sets both links to an ACM setting derived from the link whose channel conditions are the worst, so that both links produce frames having acceptable performance. In this case, the link having the better channel conditions may potentially provide higher throughput, but is forced to remain at a lower data rate in order to provide hitless protection to the worse link. In this case, potential throughput is compromised for the sake of protection.

Under a different policy, the system controller may set both links to an ACM setting derived from the link having the best channel conditions. In this case, the link throughput is increased, but the level of protection is typically degraded. While some frames received over the link having the worse channel condition may be decoded correctly, other frames may have unacceptable performance and will not be able to provide protection. In other words, some protection capability is traded for throughput. Under yet another policy, the system controller may choose to set the two links to an intermediate ACM setting, or to any other suitable ACM setting.

In alternative embodiments, controller 80 may set different ACM settings on the primary and the secondary links. In these embodiments, each of the primary and secondary links is assigned an ACM setting in accordance with its channel conditions. Thus, the data rates of the two channels may differ from one another. MUX 72 continuously selects the frames of the higher data rate link, and disregards the lower data rate frames of the other link.

When the channel conditions of the higher data rate link deteriorate beyond those of the other link, the controller may choose to switch, using MUX 72, to the frames received by the lower rate link. This switching operation may be hitless or involve some data loss, depending on the specific implementation.

For example, in some embodiments, part of the data transmitted over the primary link is classified as sensitive data that requires protection. While all data is transmitted over the primary link, only the sensitive data is transmitted over the secondary link. Thus, the primary link operates at a higher data rate than the secondary link. As long as channel conditions in the primary link are acceptable, the system controller selects to extract the data from the primary link. When the primary link's conditions deteriorate, the controller may switch to the secondary link. In this configuration, only the sensitive data, i.e., the data common to the two links, is protected.

Since in the configuration described above the primary and secondary links use different ACM settings, switching from the primary to the secondary link usually involves some data loss. In some embodiments, however, link 20 can provide hitless protection to the sensitive data. For example, when the primary link conditions deteriorate, controller 80 may gradually change the ACM setting of the primary link to ACM settings having lower data rates, until both the primary and secondary links use the same ACM setting. At this stage, the controller synchronizes the two links, i.e., causes them to transmit the same data in parallel, time-synchronized frames. If the primary link continues to deteriorate, the controller can perform a hitless switch to the secondary link.

In embodiments in which the primary and secondary links use different ACM settings, protection capability is typically traded for throughput. In order to support these configurations, transmitter 24 generally comprises two separate framers 36 that serve the primary and secondary links The policies carried out by the system controller may change over time. For example, different ACM settings may imply different policies. Additionally or alternatively, the policy may change over time based on, for example, user input.

When implementing any of the policies described above, the system controller may accept raw channel condition estimates from the primary and secondary receivers and determine the desired ACM settings. Alternatively, each of the two receivers may determine a requested, or target, ACM setting for its link and send the request to the controller.

The change of ACM setting is typically performed synchronously in the different elements of link 20. In embodiments in which a single ACM setting is assigned to both the primary and the secondary links, controller 80 notifies framer 36 of the new ACM setting to be used. Framer 36 inserts ACM setting indications into the formatted frames. Transmit modems 45, receive modems 70, MUX 72 and de-framer 76 extract the ACM setting indications from the frames and change their settings accordingly. As a result, synchronization between the primary and secondary links is maintained.

In embodiments in which different ACM settings may be assigned to the primary and secondary links, transmitter 24 comprises two separate framers 36 serving the two links. In these embodiments, the system controller notifies each framer of the ACM setting assigned to its respective link. Each framer inserts the appropriate ACM setting indications into the frames it produces. The transmit and receive modems of each link extract the ACM setting indications and synchronize accordingly. MUX 72 and de-framer 76 synchronize with the currently-selected link.

Typically, link 20 comprises a reverse communication channel 82, which enables management data to be transmitted from receiver 28 to transmitter 24. Controller 80 may be physically located either in transmitter 24 or in receiver 28. When the system controller is located in the receiver, the reverse channel is used for notifying the new ACM setting to framer 36. When the system controller is located in the transmitter, the reverse channel is used to transmit the channel condition estimates or the requested ACM settings from the primary and secondary receivers to the system controller. When link 20 is part of a bidirectional link, the reverse channel can be implemented by inserting the management data into the traffic of the opposite direction link.

Typically, the system controller comprises a general-purpose processor, which is programmed in software to carry out the functions described herein. The software may be downloaded to the processor in electronic form, either locally or over a network.

The link configuration of FIG. 1 is an exemplary configuration, chosen purely for the sake of conceptual clarity, and other suitable configurations can also be used. For example, a single transmit antenna can serve both the primary and secondary links instead of antennas 48 and 52. Similarly, dual receiver 28 can use a single receive antenna. If both links share the same transmit and receive antennas, diversity between the links should be achieved using other means, such as using different frequencies or polarizations for the two links.

Although FIG. 1 focuses on a single transmission direction, link 20 may comprise a bidirectional communication link between two communication systems. Each system comprises a dual transmitter and a dual receiver. In these embodiments, some system elements may be common to both the receiver and transmitter. For example, the transmit and receive modems of a particular system can be implemented as a single, variable-rate modem. Although some hardware may be common to both link directions, each direction functions as an independent communication link.

Figure 2:
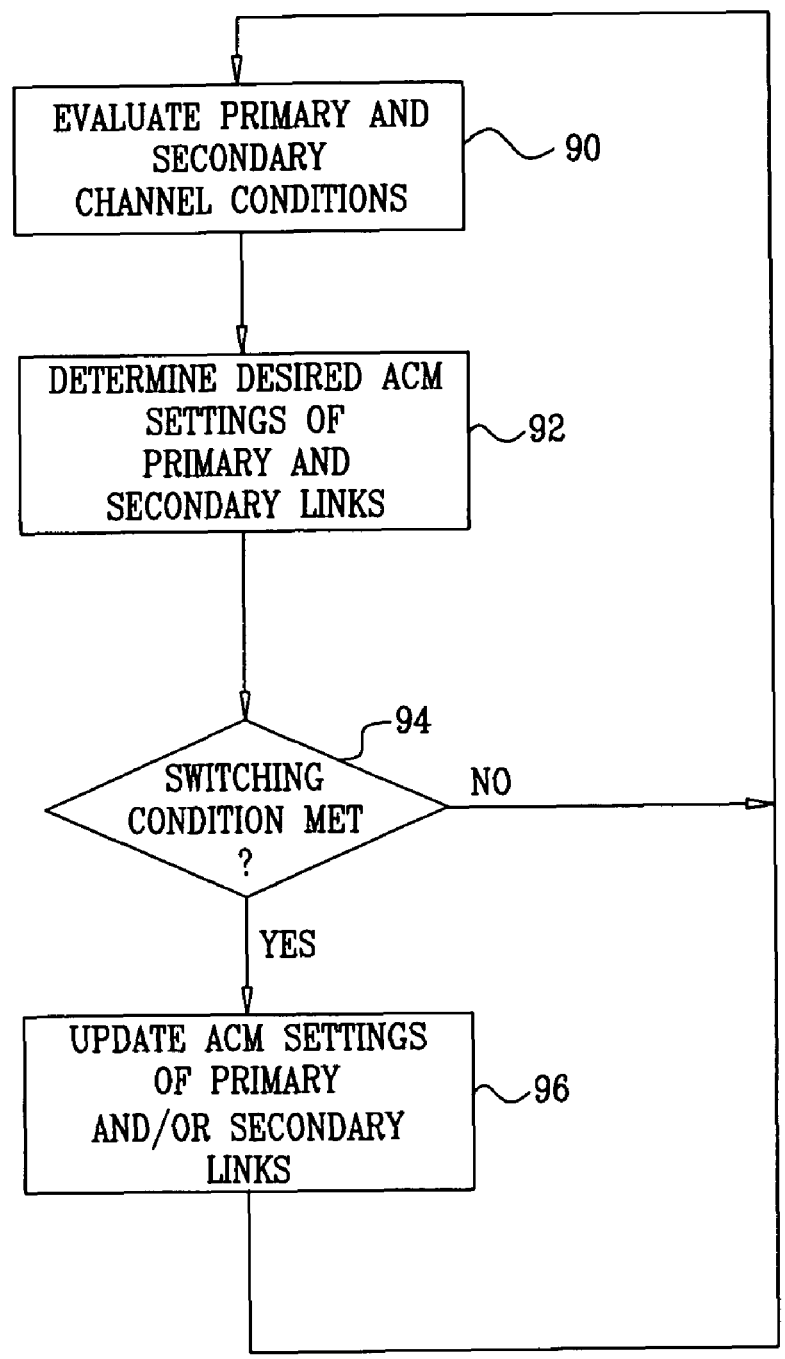
FIG. 2 is a flow chart that schematically illustrates a method for data rate coordination in a protected communication link, in accordance with an embodiment of the present invention.

FIG. 2 is a flow chart that schematically illustrates a method for data rate coordination in communication link 20, in accordance with an embodiment of the present invention. The method begins with primary receiver 64 and secondary receiver 68 evaluating their respective channel conditions, at a channel evaluation step 90. System controller 80 determines the desired ACM settings in the two links, based on the evaluated channel conditions, at a desired setting calculation step 92. Alternatively, each of receivers 64 and 68 determines the desired ACM setting of its link and reports the requested ACM setting to the system controller.

System controller 80 examines the channel conditions (or the ACM setting requests) of the primary and determines whether or not to change the ACM settings, at a change evaluation step 94. The controller evaluates a change condition, which is typically pre-configured according to operator policy. Several possible policies were described hereinabove, and the controller may alternatively use any other suitable condition.

If the controller determines that no change in ACM setting is necessary, the method loops back to step 90 above. Otherwise, the controller initiates a change of ACM settings, at a setting update step 96. As described above, the controller may set the same ACM setting or different settings in the primary and secondary links.

The system controller may use any suitable method for coordinating and synchronizing the change in ACM setting among the transmitters and receivers of the primary and secondary links. For example, in some embodiments each data frame comprises an ACM field, which indicates the ACM setting used in the next frame. Alternatively, the ACM field may indicate the ACM setting of the current frame or of a frame having any other offset with respect to the current frame. The system controller, using framer 36, inserts the desired ACM setting indication into the ACM setting fields of the data frames. When the data frames traverse the primary and secondary links, the transmitters and receivers extract the contents of the ACM setting fields and configure their ACM settings accordingly.

Protection of Multiple Links

In some embodiments, link 20 may comprise N primary links, N>1. The primary links typically transfer different data streams and may use different ACM settings. An additional link is defined as a secondary link and is assigned to provide protection to any one of the primary links. A system controller common to all N+1 links typically monitors the channel conditions of the links, and implements the desired protection policy. Any suitable policy can be used for determining which of the N primary links is to be protected by the secondary link. These configurations are referred to as 1:N protection.

For example, the system controller may identify the primary link having the worst channel conditions, i.e., the link most likely to require protection. The controller then assigns the secondary link to protect the identified primary link. For example, in some embodiments the secondary link begins to transmit the same data as the primary link it protects, using parallel time-synchronized frames. The data is then extracted on a frame-by-frame basis from either the primary link or the secondary link. Alternatively, the secondary link can protect the selected primary link using any of the methods and configurations described above. The system controller continues to monitor the channel conditions of the N primary links, and may occasionally select a different primary link to be protected by the secondary link.

Alternatively, M:N protection, in which M secondary links protect N primary links, can similarly be implemented. In both 1:N and M:N configurations, the system controller can carry out any suitable policy for changing the ACM settings of the various links, determining which primary link(s) should be protected, and switching to the secondary link(s) when necessary.

Although the embodiments described herein mainly address configurations in which the primary and secondary links have separate transmitters and receivers that are continuously active, the principles of the present invention can also be used in other configurations. For example, the primary and/or secondary links may operate during only part of the time. Additionally or alternatively, some of the transmitter and/or receiver hardware may be shared between the primary and secondary links.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
   sending first data over a first communication link to a destination communication system at a first data rate, which can be varied;
   sending second data, comprising at least a portion of the first data, over a second communication link, to the destination communication system at a second data rate, which can be varied;
   jointly setting respective first and second data rates of the first and second communication links to values that enable selective extraction of at least the portion of the first data from one of the communication links at the destination communication system;
   wherein jointly setting the first and second data rates comprises forcing a data rate on one of the first and second communication links to have a sub-optimal value;
   wherein the sub-optimal value causes sub-optimal throughput on the one of the first and second communication links, but provides reliable selective extraction of the first data from the first and second communication links; and
   at the destination communication system, selectively extracting at least the portion of the first data from one of the first and second data.

2. The method according to claim 1, wherein jointly setting the first and second data rates comprises setting the data rates responsively to at least one parameter selected from a group of parameters consisting of a characteristic of the first communication link, a metric derived from the first communication link, an operating condition of the first communication link, a characteristic of the second communication link, a metric derived from the second communication link and an operating condition of the second communication link.

3. The method according to claim 1, wherein the first data equals the second data, and wherein selectively extracting at least the portion of the first data comprises dynamically switching between the first and second communication links.

4. The method according to claim 3, wherein dynamically switching between the first and second communication links comprises alternating between the first and second data without data loss.

5. The method according to claim 3, wherein sending the first and second data comprises framing the first data in data frames and sending first and second replicas of the data frames respectively over the first and second communication links, and wherein dynamically switching between the first and second communication links comprises extracting each of the data frames from one of the first and second replicas.

6. The method according to claim 5, wherein framing the first data in the data frames comprises encoding the first data using a forward error correction (FEC) code to produce FEC blocks, and framing each of the FEC blocks in one of the respective data frames.

7. The method according to claim 1, wherein the first and second communication links comprise point-to-point links operating in one of a microwave and a millimeter wave frequency band.

8. The method according to claim 1, wherein selectively extracting at least the portion of the first data comprises calculating reception quality metrics of the first and second communication links and extracting at least the portion of the first data from one of the first and second data responsively to the reception quality metrics.

9. The method according to claim 8, wherein selectively extracting at least the portion of the first data comprises extracting at least the portion of the first data from the first data as long as the reception quality metric of the first communication link does not exceed a predetermined threshold.

10. The method according to claim 8, wherein the reception quality metrics comprise at least one metric selected from a group of metrics consisting of bit error rates (BER), frame error rates (FER), signal to noise ratios (SNR), mean square errors (MSE), forward error correction (FEC) code indications and metrics derived from equalizer coefficients.

11. The method according to claim 1, wherein sending the first and second data comprises encoding the first and second data using respective first and second forward error correction (FEC) codes and modulating the encoded first and second data using respective first and second signal constellations, and wherein jointly setting the first and second data rates comprises jointly selecting the first and second FEC codes and the first and second signal constellations.

12. The method according to claim 1, wherein jointly setting the first and second data rates comprises calculating a first data rate value for the first communication link irrespective of the second communication link, calculating a second data rate value for the second communication link irrespective of the first communication link, and setting the first and second data rates responsively to the first and second values.

13. The method according to claim 12, wherein calculating the first and second data rate values comprises determining the data rate values responsively to respective first and second reception quality metrics of the first and second communication links and to a target quality of service defined for the first and second communication links.

14. The method according to claim 12, wherein calculating the first and second data rate values comprises determining the data rate values responsively to a service type carried by the first and second data.

15. The method according to claim 12, wherein jointly setting the first and second data rates comprises setting the first and second data rates to a minimum of the first and second data rate values.

16. The method according to claim 12, wherein jointly setting the first and second data rates comprises setting the first and second data rates to an intermediate data rate between the first and second data rate values.

17. The method according to claim 1, wherein the first data rate is higher than the second data rate, and wherein sending the first and second data comprises sending only the portion of the first data over the second communication link in order to protect the portion of the first data.

18. The method according to claim 1, wherein jointly setting the first and second data rates comprises synchronizing modifications of the first and second data rates between the first and second communication links and between the source and destination communication systems.

19. The method according to claim 1, wherein the first communication link is part of a plurality of communication links, wherein the second communication link comprises a backup link for protecting one of the plurality of the communication links, and comprising assigning the second communication link to protect the first communication link.

20. The method according to claim 19, and comprising monitoring respective channel conditions of the plurality of the communication links, and selecting a link having worst channel conditions among the plurality to serve as the first communication link and to be protected by the second communication link.

21. The method according to claim 19, wherein the backup link is part of two or more backup links for protecting respective two or more of the plurality of the communication links.

22. The method according to claim 1, wherein jointly setting the first and second data rates comprises modifying the first and second data rates in coordination.

23. A communication apparatus, comprising:
a source communication system, which is arranged to transmit first data over a first communication link at a first data rate, which can be varied, and to transmit second data, comprising at least a portion of the first data, over a second communication link at a second data rate, which can be varied; and
a destination communication system, which is arranged to receive the first and second data and to selectively extract at least the portion of the first data from one of the first and second data, wherein one of the source and destination communication systems comprises a controller, which is arranged to jointly set the first and second data rates in the first and second communication links to values that enable selective extraction of at least the portion of the first data from one of the communication links at the destination communication system;
wherein the controller is arranged to jointly set the first and second data rates by forcing a data rate on one of the first and second communication links to have a sub-optimal value; and
wherein the sub-optimal value causes sub-optimal throughput on the one of the first and second communication links, but provides reliable selective extraction of the first data from the first and second communication links.

24. The apparatus according to claim 23, wherein the controller is arranged to jointly set the first and second data rates responsively to at least one parameter selected from a group of parameters consisting of a characteristic of the first communication link, a metric derived from the first communication link, an operating condition of the first communication link, a characteristic of the second communication link, a metric derived from the second communication link and an operating condition of the second communication link.

25. The apparatus according to claim 23, wherein the first data equals the second data, and wherein the destination communication system is arranged to selectively extract at least the portion of the first data by dynamically switching between the first and second communication links.

26. The apparatus according to claim 25, wherein the destination communication system is arranged to switch between the first and second communication links without data loss.

27. The apparatus according to claim 25, wherein the source communication system is arranged to frame the first data in data frames and to send first and second replicas of the data frames respectively over the first and second communication links, and wherein the destination communication system comprises a multiplexer (MUX), which is arranged to extract each of the data frames from one of the first and second replicas.

28. The apparatus according to claim 27, wherein the source communication system is arranged to encode the first data using a forward error correction (FEC) code to produce FEC blocks, and to frame each of the FEC blocks in one of the respective data frames.

29. The apparatus according to claim 23, wherein the first and second communication links comprise point-to-point links operating in one of a microwave and a millimeter wave frequency band.

30. The apparatus according to claim 23, wherein the controller is arranged to calculate reception quality metrics of the first and second communication links, and to cause the destination communication system to extract at least the portion of the first data from one of the first and second data responsively to the reception quality metrics.

31. The apparatus according to claim 30, wherein the controller is arranged to cause the destination communication system to extract at least the portion of the first data from the first data as long as the reception quality metric of the first communication link does not exceed a predetermined threshold.

32. The apparatus according to claim 30, wherein the reception quality metrics comprise at least one metric selected from a group consisting of bit error rates (BER), frame error rates (FER), signal to noise ratios (SNR), mean square errors (MSE), forward error correction (FEC) code indications and metrics derived from equalizer coefficients.

33. The apparatus according to claim 23, wherein the source communication system comprises first and second variable-rate transmit modems, which are arranged to respectively encode the first and second data using first and second forward error correction (FEC) codes and to modulate the encoded first and second data using respective first and second signal constellations, and wherein the controller is arranged to jointly select the first and second FEC codes and the first and second signal constellations.

34. The apparatus according to claim 23, wherein the destination communication system comprises first and second variable-rate receive modems, which are respectively arranged to demodulate and decode the first and second data, and wherein the receive modems and the controller are arranged to calculate a first data rate value for the first communication link irrespective of the second communication link, to calculate a second data rate value for the second communication link irrespective of the first communication link, and to set the first and second data rates responsively to the first and second values.

35. The apparatus according to claim 34, wherein the receive modems and the controller are arranged to calculate the first and second data rate values responsively to respective first and second reception quality metrics of the first and second communication links and to a target quality of service defined for the first and second communication links.

36. The apparatus according to claim 34, wherein the receive modems and the controller are arranged to calculate the first and second data rate values responsively to a service type carried by the first and second data.

37. The apparatus according to claim 34, wherein the receive modems and the controller are arranged to set the first and second data rates to a minimum of the first and second data rate values.

38. The apparatus according to claim 34, wherein the receive modems and the controller are arranged to set the first and second data rates to an intermediate data rate between the first and second data rate values.

39. The apparatus according to claim 23, wherein the first data rate is higher than the second data rate, and wherein the source communication system is arranged to send only the portion of the first data over the second communication link in order to protect the portion of the first data.

40. The apparatus according to claim 23, wherein the source communication system is arranged to synchronize modifications in the first and second data rates between the first and second communication links and between the source and destination communication systems.

41. The apparatus according to claim 23, and comprising a plurality of communication links connecting the source and destination communication systems, wherein the plurality of communication links comprises the first communication link, wherein the second communication link comprises a backup link for protecting one of the plurality of the communication links, and wherein the controller is arranged to assign the second communication link to protect the first communication link.

42. The apparatus according to claim 41, wherein the controller is arranged to monitor respective channel conditions of the plurality of the communication links, and to select a link having worst channel conditions among the plurality to serve as the first communication link and to be protected by the second communication link.

43. The apparatus according to claim 41, wherein the backup link is part of two or more backup links for protecting respective two or more of the plurality of communication links.

44. The apparatus according to claim 23, wherein the controller is arranged to modify the first and second data rates in coordination.

45. A method for communication, comprising:
sending first data over a first communication link to a destination communication system at a first data rate, which can be varied;
sending second data, comprising at least a portion of the first data, over a second communication link, from a source communication system to the destination communication system at a second data rate, which can be varied;
dynamically setting respective first and second data rates of the first and second communication links; and
at the destination communication system, selectively extracting at least the portion of the first data from one of the first and second data,
wherein the first data rate is higher than the second data rate, and wherein sending the first and second data comprises sending only the portion of the first data over the second communication link in order to protect the portion of the first data, and
wherein, when channel conditions of the first communication link deteriorate, dynamically setting the first and second data rates comprises:
reducing the first data rate while extracting at least the portion of the first data from the first communication link;
when the first data rate reaches the second data rate, synchronizing the first and second data; and
when the channel conditions of the first communication link further deteriorate, beginning to extract at least the portion of the first data from the second communication link without data loss.

46. A communication apparatus, comprising:

a source communication system, which is arranged to transmit first data over a first communication link at a first data rate, which can be varied, and to transmit second data, comprising at least a portion of the first data, over a second communication link at a second data rate, which can be varied; and a destination communication system, which is arranged to receive the first and second data and to selectively extract at least the portion of the first data from one of the first and second data, wherein one of the source and destination communication systems comprises a controller, which is arranged to dynamically set the first and second data rates in the first and second communication links, wherein the first data rate is higher than the second data rate, and wherein the source communication system is arranged to send only the portion of the first data over the second communication link in order to protect the portion of the first data, and wherein, when channel conditions of the first communication link deteriorate, the source and destination communication system are arranged to reduce the first data rate while extracting at least the portion of the first data from the first communication link, to synchronize the first and second data when the first data rate reaches the second data rate, and when the channel conditions of the first communication link further deteriorate, to begin extracting at least the portion of the first data from the second communication link without data loss.

47. A method for communication, comprising:

sending first data over a first communication link to a destination communication system at a first data rate, which can be varied;

sending second data, comprising at least a portion of the first data, over a second communication link, to the destination communication system at a second data rate, which can be varied;

jointly setting respective first and second data rates of the first and second communication links to values that enable selective extraction of at least the portion of the first data from one of the communication links at the destination communication system;

wherein jointly setting the first and second data rates comprises forcing a data rate on one of the first and second communication links to a higher data rate according to the link having the best channel conditions;

wherein the set date rates cause sub-optimal error probability on the one of the first and second communication links, but provides high throughput on both the first and the second communication links; and at the destination communication system, selectively extracting at least the portion of the first data from one of the first and second data.

48. The method according to claim 47, wherein jointly setting the first and second data rates comprises setting the first and second data rates to a maximum of the first and second data rate values.

49. A communication apparatus, comprising:

a source communication system, which is arranged to transmit first data over a first communication link at a first data rate, which can be varied, and to transmit second data, comprising at least a portion of the first data, over a second communication link at a second data rate, which can be varied; and a destination communication system, which is arranged to receive the first and second data and to selectively extract at least the portion of the first data from one of the first and second data, wherein one of the source and destination communication systems comprises a controller, which is arranged to jointly set the first and second data rates in the first and second communication links to values that enable selective extraction of at least the portion of the first data from one of the communication links at the destination communication system;

wherein the controller is arranged to jointly set the first and second data rates by forcing a data rate on one of the first and second communication links to a higher data rate according to the link having the best channel conditions; and wherein the set data rates cause sub-optimal error probability on the one of the first and second communication links, but provides high throughput on both the first and the second communication links.

50. The apparatus according to claim 49, wherein the receive modems and the controller are arranged to set the first and second data rates to a maximum of the first and second data rate values.

* * * * *